United States Patent Office 3,326,908
Patented June 20, 1967

3,326,908
NOVEL PROCESS FOR THE PREPARATION OF DIHYDROBENZOTHIADIAZINES
John G. Topliss, West Caldwell, Margaret H. Sherlock, Bloomfield, and Nathan Sperber, North Caldwell, N.J., assignors to Schering Corporation, Bloomfield, N.J., a corporation of New Jersey
No Drawing. Filed July 6, 1965, Ser. No. 469,850
8 Claims. (Cl. 260—243)

This application is a continuation-in-part of our copending application, Ser. No. 24,262, filed on Apr. 25, 1960, now U.S. Patent 3,206,507. This invention relates to a new process for the manufacture of therapeutically useful substances and to new and useful intermediates produced therein. More particularly, this invention relates to novel chlorosulfonyl anilidenes, their preparation and transformation into therapeutically useful 3,4-dihydro-1,2,4-benzothiadiazine-1,1-dioxides.

According to our novel process, an aniline-2,4-disulfonyl chloride (I) is reacted with an aldehydic reactant, such as an aldehyde or a derivative convertible thereinto, such as an acetal or a hydrate, in the presence of a strong acid catalyst, whereby a 2,4-di-(chlorosulfonyl)-anilidene (II) is produced. These anilidenes (II), when reacted with ammonia or a mono-substituted amine, preferably the former, undergo amination of the sulfonyl chloride groups and subsequent ring closure, thus forming the therapeutically useful 3,4-dihydro-1,2,4-benzothiadiazine-1,1-dioxides (IV). The process employing ammonia and the novel compounds of this invention are illustrated in the following equation:

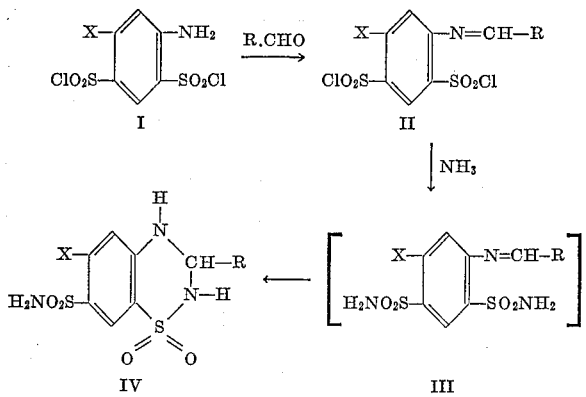

In the foregoing scheme X represents halogeno (such as chloro, bromo, fluoro) lower alkyl, nitro, lower alkoxy and trifluoromethyl; and R represents lower alkyl, haloloweralkyl having up to three halogen substituents, such as chloromethyl, dichloromethyl and trifluoromethyl, aralkyl such as benzyl which may be aromatically substituted by halogen, lower alkyl or lower alkoxy and the like, mono-homocyclic and heterocyclic aryl such as phenyl, and pyridyl which may contain further substituents such as alkyl and halogen, benzylthioloweralkyl, 5-norbornylenyl, and 2,2,2-trifluoroethylthiomethyl. The term "lower" of "loweralkyl" and "loweralkoxy" is meant to embrace those radicals having from 1–6 carbon atoms.

The condensation reaction is generally carried out at above room temperatures, preferably in the presence of a solvent.

When carried out in the absence of a solvent, the temperature range is from about 40° C. to the boiling point of the aldehydic reactant, although the preferred range is from about 80° C. to about 100° C. When the condensation reaction is carried out in the presence of a solvent the temperature is usually maintained at the reflux temperature of the mixture. The heating is usually continued for several hours until the reaction is complete, as may be indicated by a rise in temperature within the reaction vessel. The concentration of the reactants may be in equal molar quantities, or an excess of the aldehydic compound may be used. While not a necessity to the mechanism of the condensation, it is preferable to effect the condensation in the presence of a strong acid catalyst, said catalyst being present in amounts up to about 0.03 mole per mole of disulfonyl chloride reactant, and also to make provision for the removal of water formed by the reaction, preferably by azeotropic techniques. If necessary, the reaction may be performed under increased pressure or in the atmosphere of an inert gas, e.g., nitrogen. In instances wherein an acetal is a reactant, it is advantageous to initially add a small catalytic quantity of water to the system.

The amination and cyclization of the condensation products to form the therapeutically valuable 3,4-dihydro-1,2,4-benzothiadiazine-1,1-dioxides is effected with the use of ammonia (II→IV). The reaction is preferably carried out using an excess of liquid ammonia in quantities wherein the ammonia itself may behave as the reaction solvent. Ammonia can be added in the form of aqueous or alcoholic ammonia or by dissolving the 2,4-(di-(chlorosulfonyl)-anilidene in an inert organic solvent (such as benzene, toluene and the like) and bubbling ammonia gas into the solution.

As the amination reaction may be quite vigorous, it is preferred to add the 2,4-di-(chlorosulfonyl)-anilidene (II) to liquid ammonia in a gradual portionwise fashion. The excess ammonia is evaporated leaving a residue which may be triturated with water or dilute acid to neutralize any remaining traces of ammonia.

The so-prepared 3,4-dihydro-1,2,4-benzothiadiazine-1,1-dioxides may then be purified by usual methods well known in the art such as crystallization from a solvent.

The aniline-2,4-disulfonyl chlorides used in this may be prepared by reacting 3-chloroaniline, 3-bromoaniline, 3-fluoroaniline, and 3-trifluoromethylaniline with chlorosulfonic acid according to procedures well described in the art.

The aldehydic compounds that may be condensed with the aniline-2,4-disulfonyl chloride may be an aldehyde or a derivative convertible thereinto. Representative of suitable aldehydic reactants are: alkanals such as acetaldehyde, propionaldehyde, n-butyraldehyde, iso-butyraldehyde, valeraldehyde, caproaldehyde, and enanthaldehyde; halo-alkanals such as chloroacetaldehyde, dichloroacetaldehyde, chloral; alkenals such as acrolein, methacrolein, crotonaldehyde, and 4-pentenal; alkoxyalkanals such as methoxyacetaldehyde, ethoxyacetaldehyde, β-methoxypropionaldehyde and β-methoxy-n-butyraldehyde; alkanoylalkanals such as acetoacetaldehyde, propionylacetaldehyde and δ-hexanoyl-n-butyraldehyde; aromatic aldehydes such as benzaldehyde, o,m, and p-tolualdehyde, hexahydro benzaldehyde, phenylacetaldehyde, hydrocinnamaldehyde, and hydroxy or lower alkoxybenzaldehydes (e.g., salicylaldehyde and anisaldehyde); monocyclic heterocyclic aldehydes such as 2,3-or 4-pyridyl-aldehyde and pyrrolealdehyde; benzylthioalkylaldehydes such as benzylthioacetaldehyde, 2,2,2-trifluoroethylacetaldehyde, and 5-norbornylenylaldehyde and the acetals and hydrates of the foregoing; vinyl ethers and halo vinyl ethers such as ethyl vinyl ether, and β,β-dichlorovinylethyl ether; and ethers and halo ethers such as ethyl ether and 1,2,2,-trichloroethyl ether.

Among the more suitable acid catalysts are strong mineral acid catalysts such as hydrochloric acid and sulfuric acid; and others represented by p-toluenesulfonic acid and trichloroacetic acid.

As indicated above, it is possible to conduct the condensation reaction without a separate solvent, as when an aniline-2,4-disulfonyl chloride is condsensed with an aromatic aldehyde, e.g., benzaldehyde; however, a solvent is preferably employed. Solvents suitable for use in this reaction include polyglycol ethers, such as diethylene glycol dimethyl ether; esters such as ethyl acetate; cyclic ethers such as dioxane and tetrahydrofuran; and aromatic hydrocarbons such as benzene and toluene. When water is a by-product of the condensation reaction, it is preferred to use water immiscible solvents capable of forming an azeotropic mixture with water, e.g., benzene, toluene, xylene and the like.

The preparation of these compounds is more fully described in the following examples. It is to be understood, however, that the examples are illustrative of the process, and compounds embraced by this invention are not to be construed as limiting the invention to the particular compounds or process specifically exemplified.

EXAMPLE 1

*3-dichloromethyl-6-chloro-7-sulfamyl-3,4-dihydro-1,2,4-benzothiadiazine-1,1-dioxide*

(A) *5-chloro-(β,β-dichloroethylideneamino)-benzene-2,4-disulfonyl chloride.*—To a solution of 10 g. of 5-chloroaniline-2,4-disulfonyl chloride in 250 cc. of benzene are added 5.2 g. of dichloroacetaldehyde and 0.2 g. of p-toluenesulfonic acid, and the resulting mixture is refluxed for 16 hours with continuous azeotropic removal of water. The benzene is removed by evaporation under reduced pressure and the residual product is crystallized from an acetone-water system to give 5-chloro-(β,β-dicloroethylideneamino)-benzene-2,4-disulfonyl chloride as light yellow needles, M.P. 153–154° C.

(B) *3-dichloromethyl-6-chloro-7-sulfamyl-3,4-dihydro-1,2,4-benzothiadiazine-1,1-dioxide.* — 5 - chloro - (β,β-dichloroethylideneamina)-benzene-2,4-disulfonyl chloride, prepared as in part A above, is gradually added to 30 cc. of liquid ammonia. The excess of liquid ammonia is rapidly evaporated and the residue is immediately acidified with 30 cc. of cold 10% hydrochloric acid, which upon trituration yields a light-colored solid which is collected by filtration, washed with cold water, dried, and crystallized from a methanolchloroform system to give 3-dichloromethyl - 6 - chloro - 7 - sulfamyl-3,4-dihydro-1,2,4-benzothiadiazine-1,1-dioxide, M.P. 273–274° C.

In a manner similar to that described in Part A of Example 1, other anilidene-2,4-disulfonyl chlorides such as the following are prepared: 5-chloro-(ethylideneamino)-benzene-2,4-disulfonyl chloride by the reaction of acetaldehyde and 5-chloroaniline-2,4-disulfonyl chloride; 5-chloro-(propylideneamino)-benzene-2,4-disulfonyl chloride by the reaction of propionaldehyde with 5-chloroaniline-2,4-disulfonyl chloride. Similarly, by reacting 5-chloroaniline-2,4-disulfonyl chloride with n-butyraldehyde, valeraldehyde, hexahydrobenzaldehyde, β-chloracetaldehyde, chloral, acetaldehyde, β-(2-pyridyl)-propionaldehyde, benzylthioacetaldehyde, there is produced, respectively, the following: 5 - chloro - (butylideneamino)-benzene-2,4-disulfonyl chloride, 5-chloro-(pentylideneamino)-benzene-2,4-disulfonyl chloride, 5 - chloro-(hexahydrobenzlideneamino)-benzene-2,4-disulfonyl chloride, 5 - chloro - (β-chloroethylideneamino)-benzene-2,4-disulfonyl chloride, 5-chloro-(β,β,β-trichloroethylideneamino) - benzene - 2,4-disulfonyl chloride, 5-chloro-(ethylideneamino)-benzene-2,4-disulfonyl chloride, 5-chloro-(β-(2-pyridyl)-propylidene-amino)-benzene-2,4-disulfonyl chloride, 5-chloro-(benzylthioethylideneamino) - benzene - 2,4 - disulfonyl chloride.

By the reaction of these compounds with liquid ammonia, as described in part B of Example 1, there is produced 3 - propyl - 6 - chloro - 7 - sulfamyl - 3,4-dihydro - 1,2,4 - benzothiadiazine - 1,1 - dioxide, 3 - butyl-6 - chloro-7-sulfamyl-3,4-dihydro-1,2,4-benzothiadiazine-1,1 - dioxide, 3 - cyclohexyl-6-chloro-7-sulfamyl-3,4-dihydro-1,2,4 - benzothiadiazine-1,1 - dioxide, 3-chloromethyl-6 - chloro-7 - sulfamyl - 3,4 - dihydro - 1,2,4 - benzothiadiazine-1,1-dioxide, 3-trichloromethyl-6-chloro-7-sulfamyl-3,4 - dihydro-1,2,4 - benzothiadiazine-1,1 - dioxide, 3-methyl-6 - chloro-7 - sulfamyl-3,4-dihydro-1,2,4 - benzothiadiazine-1,1 - dioxide, 3 - (β-2-pyridyl)-ethyl-6-chloro-7 - sulfamyl-3,4 - dihydro-1,2,4 - benzothiadiazine-1,1-dioxide, 3 - benzylthiomethyl-6-chloro-7-sulfamyl-3,4-dihydro-1,2,4-benzothiadiazine-1,1-dioxide, respectively.

Analogously, by reacting 5-trifluoromethyl-aniline-2,4-disulfonyl chloride with dichloroacetaldehyde, phenylpropionaldehyde, benzylthioacetaldehyde, there is produced 5 - trifluoromethyl-(β,β-dichloroethylideneamino)-benzene-2,4 - disulfonyl chloride, 5 - trifluoromethyl-(phenylpropylideneamino)-benzene-2,4 - disulfonyl chloride, 5 - trifluoromethyl - (benzylthioethylideneamino)-benzene-2,4-disulfonyl chloride, respectively. These compounds when reacted with liquid ammonia produce, respectively, 3 - dichloromethyl - 6 - trifluoromethyl-7-sulfamyl-3,4 - dihydro-1,2,4 - benzothiadiazine-1,1 - dioxide, 3 - phenethyl-6 - trifluoromethyl-7 - sulfamyl-3,4-dihydro-1,2,4 - benzothiadiazine-1,1 - dioxide, 3 - benzylthiomethyl - 6 - trifluoromethyl - 7 - sulfamyl-3,4-dihydro-1,2,4-benzothiadiazine-1,1-dioxide.

EXAMPLE 2

*3-dibromomethyl-6-chloro-7-sulfamyl-3,4-dihydro-1,2,4-benzothiadiazine-1,1-dioxide*

(A) *5 - chloro-(β,β-dibromoethylideneamino)-benzene-2,4-disulfonyl chloride.*—To a solution of 10 g. of 5-chloroaniline-2,4-disulfonyl chloride in 250 cc. of benzene are added 12.7 g. of dibromoacetal, 0.2 g. of p-toluenesulfonic acid and 0.1 cc. of water, and the resulting mixture is refluxed for 16 hours. The benzene is removed by evaporation under reduced pressure and the residual product is crystallized from an acetone-water system to give 5 - chloro-(β,β-dibromoethylideneamino)-benzene-2,4-disulfonyl chloride.

(B) *3 - dibromomethyl - 6 - chloro-7-sulfamyl-3,4-dihydro - 1,2,4 - benzothiadiazine - 1,1 - dioxide.*—The 5-chloro-(β,β - dibromoethylideneamino) - benzene - 2,4-disulfonyl chloride (prepared as in part A above) is gradually added to 30 cc. of liquid ammonia. The excess of liquid ammonia is rapidly evaporated and the residue is immediately acidified with 30 cc. of cold 10% hydrochloric acid, which upon trituration yields a solid which is collected by filtration, washed with cold water, dried, and crystallized from a methanol-chloroform system to give 3-dibromomethyl-6-chloro-7-sulfamyl-3,4-dihydro-1,2,4-benzothiadiazine-1,1-dioxide.

EXAMPLE 3

*3-dichloromethyl-6-chloro-7-sulfamyl-3,4-dihydro-1,2,4-benzothiadiazine-1,1-dioxide*

(A) *5 - chloro-(β,β-dichloroethylideneamino)-benzene-2,4-disulfonyl chloride.*—To a solution of 10 g. of 5-chloroaniline-2,4-disulfonyl chloride in 250 cc. of benzene are added 5.7 g. of dichloroacetaldehyde hydrate and 0.2 g. of p-toluenesulfonic acid, and the resulting mixture is refluxed for 16 hours with continuous azeotropic removal of water. The benzene is removed by evaporation under reduced pressure and the residual product is crystallized from an acetone-water system to give 5-chloro-(β,β-dichloroethylideneamino)-benzene-2,4 - disulfonyl chloride.

(B) *3 - dichloromethyl - 6 - chloro - 7 - sulfamyl - 3,4 - dihydro - 1,2,4 - benzothiadiazine-1,1-dioxide.*—The 5-chloro-(β,β - dichloroethylideneamino)-benzene-2,4 - disulfonyl chloride obtained in part A above is dissolved in 200 ml. of toluene and ammonia gas is bubbled into the solution for three hours at 5–10° C. The solvent is removed, in vacuo, and the residue acidified with 30 cc. of cold 10% hydrochloric acid, which upon trituration yields a light-colored solid which is collected by filtration, washed with cold water, dried, and crystallized from a methanol-chloroform system to give 3-dichloromethyl-6-chloro - 7 - sulfamyl-3,4 - dihydro-1,2,4-benzothiadiazine-1,1-dioxide, M.P. 273–274° C.

EXAMPLE 4

3-phenyl-6-chloro-7-sulfamyl-3,4-dihydro-1,2,4-benzothiadiazine-1,1-dioxide (A) *5 - chloro-(benzylideneamino)-benzene-2,4 - disulfonyl chloride.*—A mixture of 10 g. of 5-chloroaniline-2,4-disulfonyl chloride, 0.2 g. of p-toluenesulfonic acid, and 25 cc. of benzaldehyde is heated at 120° C. for two hours. The excess liquids are removed by evaporation under reduced pressure, and the residual product is crystallized from an acetone-water system to give 5-chloro-(benzylideneamino)-benzene-2,4-disulfonyl chloride.

(B) *3-phenyl-6-chloro - 7 - sulfamyl - 3,4 - dihydro - 1,2,4 - benzothiadiazine - 1,1 - dioxide.*—5 chloro-(benzylideneamino) - benzene - 2,4-disulfonyl chloride (prepared as in part A above) is gradually added to 30 cc. of liquid ammonia. The excess liquid ammonia is rapidly evaporated and the residue is immediately acidified with 30 cc. of cold 10% hydrochloric acid, which upon trituration yields a solid which is collected by filtration, washed with cold water, dried, and crystallized from a methanol-chloroform system to give 3-phenyl-6-chloro-7-sulfamyl - 3,4 - dihydro - 1,2,4 - benzothiadiazine-1,1-dioxide.

We claim:

1. The process for the preparation of a 3,4-dihydro-[1,2,4] - benzothiadiazine - 1,1 - dioxide compound of the formula:

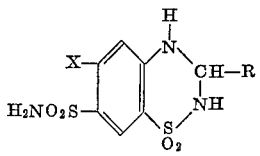

wherein X is a member selected from the group consisting of halogen, lower alkyl, nitro, lower alkoxy and trifluoromethyl, R is a member selected from the group consisting of lower alkyl, haloloweralkyl, phenyl, benzyl, pyridyl, 2,2,2-trifluoroethylthioloweralkyl and 5-norbornylenyl, which comprises heating 5 - (X) - 2,4 - dichlorosulfonyl-aniline with a compound selected from the group consisting of an aldehyde of the formula R—CHO, and the acetals and hydrates thereof, in the presence of a strong acid catalyst selected from the group consisting of mineral acids, p-toluene sulfonic acid and trichloroacetic acid, said catalyst being present in amounts up to about 0.03 mole per mole of said 2,4-dichlorosulfonyl-aniline, and treating the so-formed anilidene with ammonia.

2. The process for the preparation of 3-halolower-alkyl - 6 - halogeno - 7 sulfamyl - 3,4-dihydro-2H-[1,2,4]-benzothiadiazine-1,1-dioxide which comprises heating 5-halogeno-2-4-dichlorosulfonyl-aniline with a compound selected from the group consisting of an aldehyde of the formula R—CHO, and the acetals and hydrates thereof, wherein R represents haloloweralkyl, in the presence of a strong acid catalyst selected from the group consisting of mineral acids, p-toluene sulfonic acid and trichloroacetic acid, said acid catalyst being present in amounts up to about 0.03 mole per mole of 2,4-dichlorosulfonyl-aniline reactant and treating the so-formed anilidene with ammonia.

3. The process for the preparation of 3-dichloromethyl - 6 - chloro - 7 - sulfamyl - 3,4 - dihydro - 2H - [1,2,4]-benzothiadiazine - 1,1 - dioxide which comprises heating 5-chloro-2,4-dichlorosulfonyl-aniline with a compound selected from the group consisting of dichloroacetaldehyde and the acetal and hydrate thereof, in the presence of a strong acid catalyst selected from the group consisting of mineral acids, p-toluene sulfonic acid and trichloroacetic acid, said catalyst being present in amounts up to about 0.03 mole per mole of said 5-chloro-2,4-dichlorosulfonyl-aniline and treating the so-formed 5-chloro-($\beta,\beta$-dichloroethylideneamino)-benzene-2,4-disulfonyl chloride with ammonia.

4. The process for preparing 3-(R)-6-(X)-7-sulfamyl-3,4 - dihydro - 2H - [1,2,4] - benzothiadiazine -1,1-dioxide wherein X is a member selected from the group consisting of halogen, lower alkyl, nitro, amino, lower alkoxy and trifluoromethyl, R is a member selected from the group consisting of lower alkyl, haloloweralkyl, phenyl, benzyl, pyridyl, 2,2,2-trifluoroethylthioloweralkyl and 5-norbornylenyl, which comprises treating a compound of the formula:

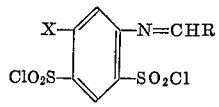

with ammonia.

5. The process for the preparation of 3-haloloweralkyl-6 -halogeno - 7 - sulfamyl - 3,4 - dihydro - 2H-[1,2,4]-benzothiadiazine-1,1-dioxide which comprises treating 5-halogeno - (haloloweralkylmethylideneamino) - benzene-2,4-disulfonyl chloride with ammonia.

6. The process for the preparation of 3-haloloweralkyl-6 - halogeno - 7 - sulfamyl - 3,4 - dihydro - 2H - [1,2,4]-benzothiadiazine - 1,1 - dioxide which comprises treating 5 - halogeno - (haloloweralkylideneamino) - benzene -2,4-disulfonyl chloride with liquid ammonia.

7. The process for the preparation of 3-dichlormethyl-6 - chloro - 7 - sulfamyl - 3,4 - dihydro - [1,2,4]-benzothiadiazine - 1,1 - dioxide, which comprises treating 5-chloro - ($\beta,\beta$ - dichloroethylideneamino) - 2,4 - disulfonyl chloride with ammonia.

8. The process for the preparation of 3-dichlormethyl-6 - chloro - 7 - sulfamyl - 3,4 - dihydro - [1,2,4]-benzothiadiazine - 1,1 - dioxide, which comprises treating 5-chloro - ($\beta,\beta$ - dichloroethylideneamino) - benzene - 2,4-disulfonyl chloride with liquid ammonia.

References Cited

UNITED STATES PATENTS 3,139,381   6/1964   Novello _____ 260—243
3,206,507   9/1965   Topliss et al. _____ 260—243

NICHOLAS S. RIZZO, *Primary Examiner.*